(12) United States Patent
Su

(10) Patent No.: US 8,449,155 B2
(45) Date of Patent: May 28, 2013

(54) ILLUMINATING MAGNIFYING LENS CAPABLE OF FOCUSING ITS LIGHT ON OBJECTS

(76) Inventor: Cheng-Wei Su, Taichung (TW)

( * ) Notice: Subject to any disclaimer, the term of this patent is extended or adjusted under 35 U.S.C. 154(b) by 153 days.

(21) Appl. No.: 13/196,677

(22) Filed: Aug. 2, 2011

(65) Prior Publication Data

US 2013/0033855 A1    Feb. 7, 2013

(51) Int. Cl.
*F21V 17/00*    (2006.01)
(52) U.S. Cl.
USPC .............................. 362/455; 359/798; 359/800
(58) Field of Classification Search
USPC ................... 362/98, 109, 157, 183, 184, 197, 362/200, 202, 205, 208, 249.01, 249.02, 362/307, 309, 340, 455; 359/798, 800–803, 359/819
See application file for complete search history.

(56) References Cited

U.S. PATENT DOCUMENTS

| | | | | |
|---|---|---|---|---|
| 1,909,662 A | * | 5/1933 | Conners | 359/803 |
| 2,316,301 A | * | 4/1943 | Ullman | 359/800 |
| 3,945,717 A | * | 3/1976 | Ryder et al. | 359/800 |
| 6,322,226 B1 | * | 11/2001 | Dickson | 362/33 |
| 6,483,651 B1 | * | 11/2002 | Maurer | 359/819 |
| 6,956,616 B2 | * | 10/2005 | Jung et al. | 348/376 |
| 6,999,248 B2 | * | 2/2006 | Schuttinger | 359/803 |
| 7,006,223 B2 | * | 2/2006 | Mullani | 356/369 |
| 7,167,244 B2 | * | 1/2007 | Mullani | 356/369 |
| 7,699,856 B2 | * | 4/2010 | Van Wyk et al. | 606/138 |
| 7,862,173 B1 | * | 1/2011 | Ellman | 351/218 |
| 2002/0145813 A1 | * | 10/2002 | Jung et al. | 359/798 |

* cited by examiner

*Primary Examiner* — Hargobind S Sawhney
(74) *Attorney, Agent, or Firm* — Alan Kamrath; Kamrath IP Lawfirm, P.A.

(57) ABSTRACT

An illuminating magnifying lens capable of focusing its light on objects in accordance with the present invention comprises a frame connected to a handle, and in a part of the handle jointing to the frame is defined an assembling groove in which being assembled a lamp, a battery and a light guiding member. When the magnifying lens is used to magnify the object, the projecting light of the lamp is restricted by the light guiding member and can only be emitted out from the open end of the guiding hole, plus there is projecting angle between the guiding hole and the lens element, therefore, the light of the lamp will be directed toward the object without projecting onto the lens element, thus preventing dazzling reflection.

3 Claims, 7 Drawing Sheets

ILLUMINATING MAGNIFYING LENS CAPABLE OF FOCUSING ITS LIGHT ON OBJECTS

BACKGROUND OF THE INVENTION

1. Field of the Invention

The present invention relates to a magnifying lens, and more particularly to an illuminating magnifying lens capable of focusing its light on objects.

2. Description of the Prior Art

Handheld magnifying lens is a very useful tool, and in order for the magnifying lens to be used in a dark environment, as shown in FIG. 1, a conventional magnifying lens 10 is provided at one side of a lens element 11 thereof with lamps 12 for illumination purpose.

It is to be noted that all the lamps 12 of the conventional illuminating magnifying lens 10 are all disposed around a lens frame 13 adjacent to the lens element 11, and the luminous point of the lamps 12 are very close to the lens element 11, such that the light of the lamps 12 will be projected on the lens element 11, causing dazzling reflection, which will have adverse influence on the use of the magnifying lens 10.

Hence, the present invention is aimed at providing a luminous magnifying lens which is free of dazzling reflection by focusing the light of the lamps onto the object to be illuminated.

The present invention has arisen to mitigate and/or obviate the afore-described disadvantages.

SUMMARY OF THE INVENTION

The primary object of the present invention is to provide an illuminating magnifying lens capable of focusing its light on objects. When the magnifying lens is used to magnify the object, the projecting light of the lamp is restricted by the light guiding member and can only be emitted out from the open end of the guiding hole, plus there is projecting angle between the guiding hole and the lens element, therefore, the light of the lamp will be directed toward the object without projecting onto the lens element, thus preventing dazzling reflection.

To achieve the above object, an illuminating magnifying lens capable of focusing its light on objects comprising: a frame connected to a handle, and in a part of the handle jointing to the frame being defined an assembling groove covered with a cover, in the cover being formed with a hole, and an optical lens element being disposed in the frame, and an imaginary line defined by a periphery of the lens element being defined as longitudinal direction; a lamp disposed in the assembling groove and aligned with the hole to allow light of the lamp to be emitted out through the hole; a battery disposed in the assembling groove as a power source of the lamp; a light guiding member being light proof, one end of the light guiding member being formed with a vertical surface to be inserted in the assembling groove; characterized in that:

a guiding surface extends from the vertical surface toward another end of the light guiding member and is formed with a guiding hole, an imaginary line extending outward from the guiding hole is defined as projecting line which defines a projecting angle ranging from 35-65 degrees with respect to the longitudinal direction of the lens element, the vertical surface of the light guiding member is inserted in the assembling groove, and the lamp is disposed in the guiding hole, so that the light of the lamp is projected toward the object through an open end of the guiding hole and the hole.

DETAILED DESCRIPTION OF THE PREFERRED EMBODIMENTS

Figure 1:
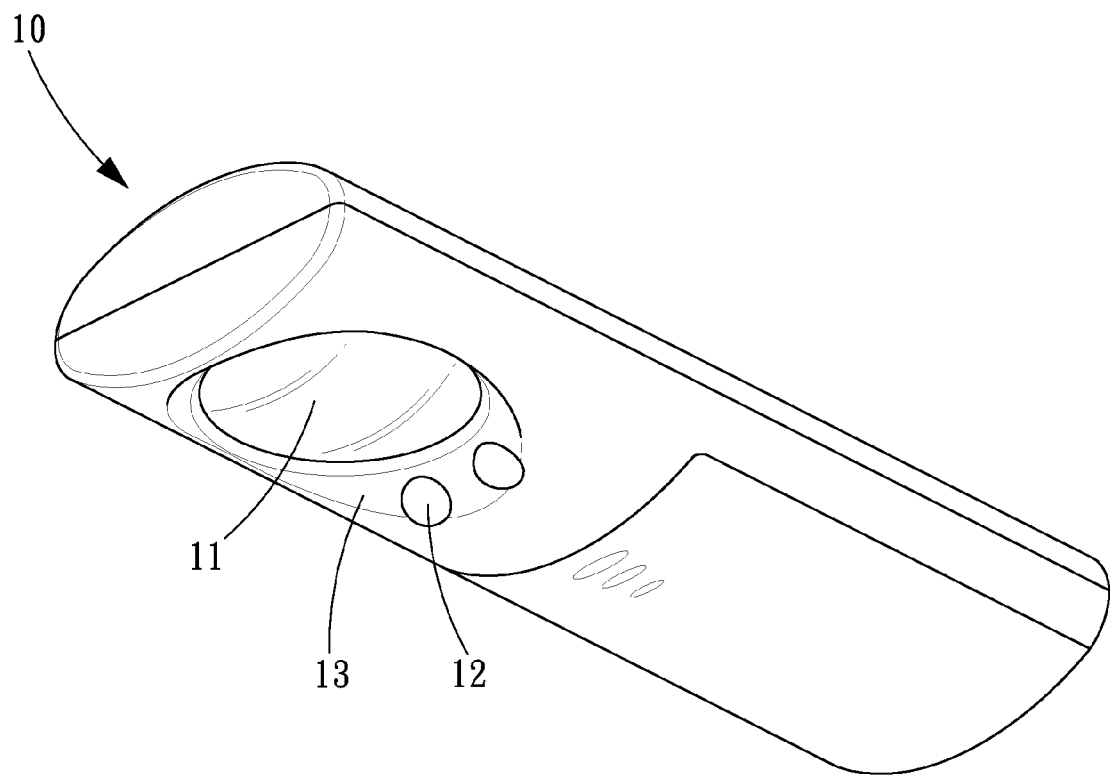
FIG. 1 is a perspective view of a conventional illuminating magnifying lens.
Figure 2:
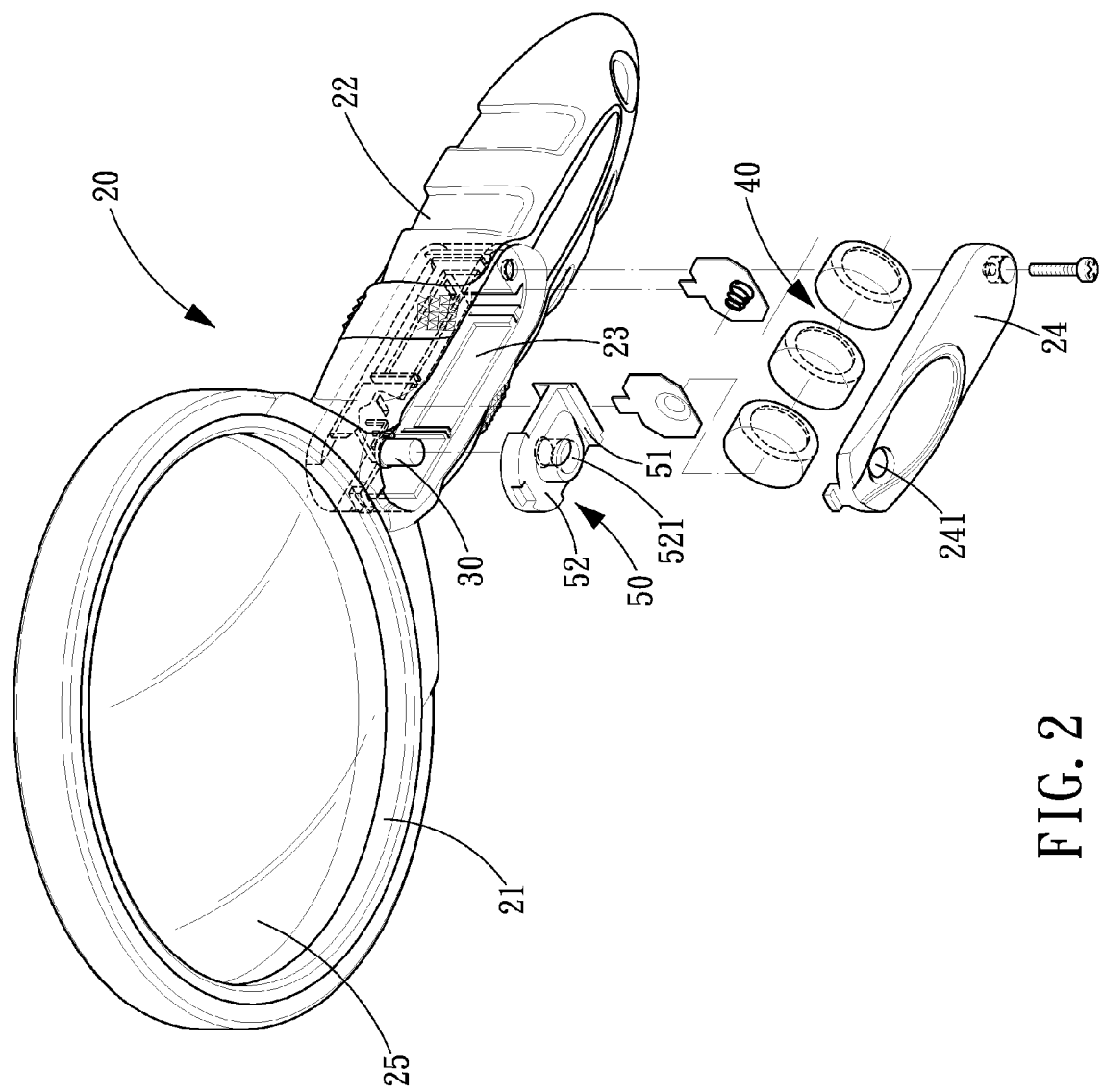
FIG. 2 is an exploded view of an illuminating magnifying lens in accordance with the present invention.

The present invention will be clearer from the following description when viewed together with the accompanying drawings, which show, for purpose of illustrations only, the preferred embodiment in accordance with the present invention.

Referring to FIGS. 2-7, an illuminating magnifying lens 20 capable of focusing its light on objects in accordance with the present invention comprises a frame 21 connected to a handle 22, and in a part of the handle 22 jointing to the frame 21 is defined an assembling groove 23 in which being assembled a lamp 30, a battery 40 and a light guiding member 50.

The assembling groove 23 of the magnifying lens 20 is covered with a cover 24 which is formed with a hole 241, and a lens element 25 is disposed in the frame 21, and the imaginary line defined by the periphery of the lens element 25 is defined as longitudinal direction A.

The lamp 30 consists of LED (light emitting diode) disposed in the assembling groove 23 and aligned with the hole 241, so that the light of the lamp 30 is emitted out through the hole 241.

The battery 40 is disposed in the assembling groove 23 as a power source of the lamp 30.

The light guiding member 50 is light proof and made of plastic, metal, wood and etc. one end of the light guiding member 50 is formed with a vertical surface 51, a guiding surface 52 extends from the vertical surface 51 toward another end of the light guiding member 50 and is formed with a guiding hole 521. The imaginary line extending outward from the guiding hole 521 is defined as projecting line B which defines a projecting angle X ranging from 35-65 degrees with respect to the longitudinal direction A of the lens element 25. The vertical surface 51 of the light guiding member 50 is inserted in the assembling groove 23, and the lamp 30 is disposed in the guiding hole 521, so that the light of the lamp 30 is projected toward the object 60 through an open end 522 of the guiding hole 521 and the hole 241.

Figure 5:
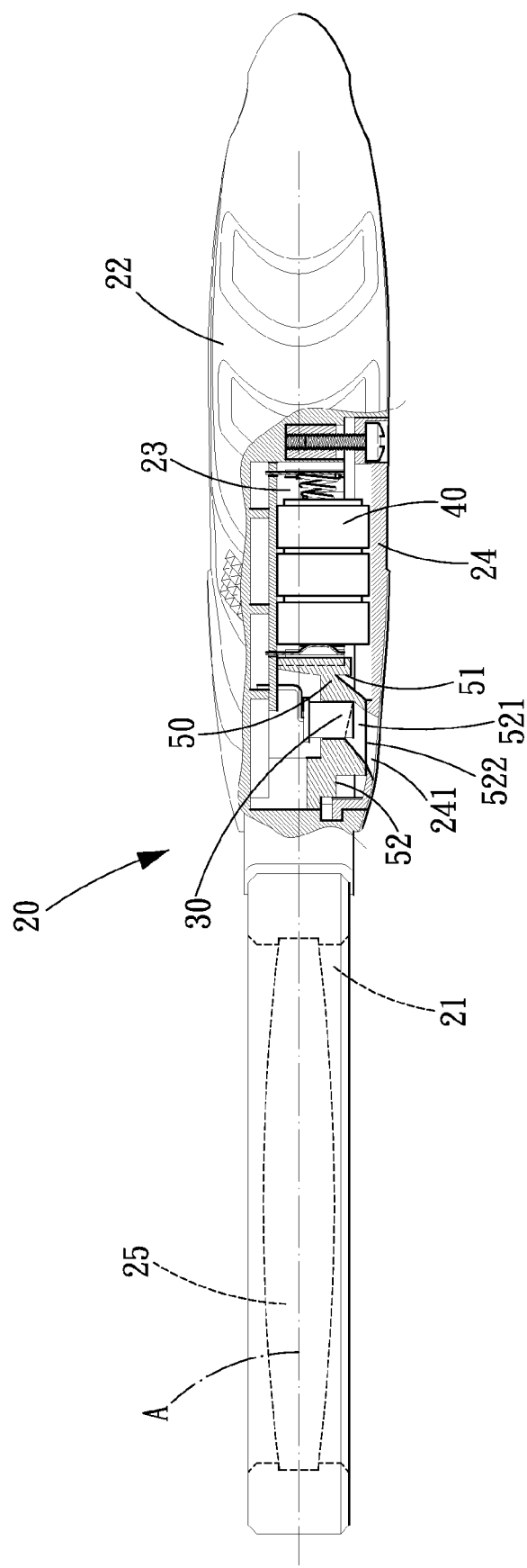
FIG. 5 is a partial cross sectional view of the illuminating magnifying lens in accordance with the present invention.
Figure 6:
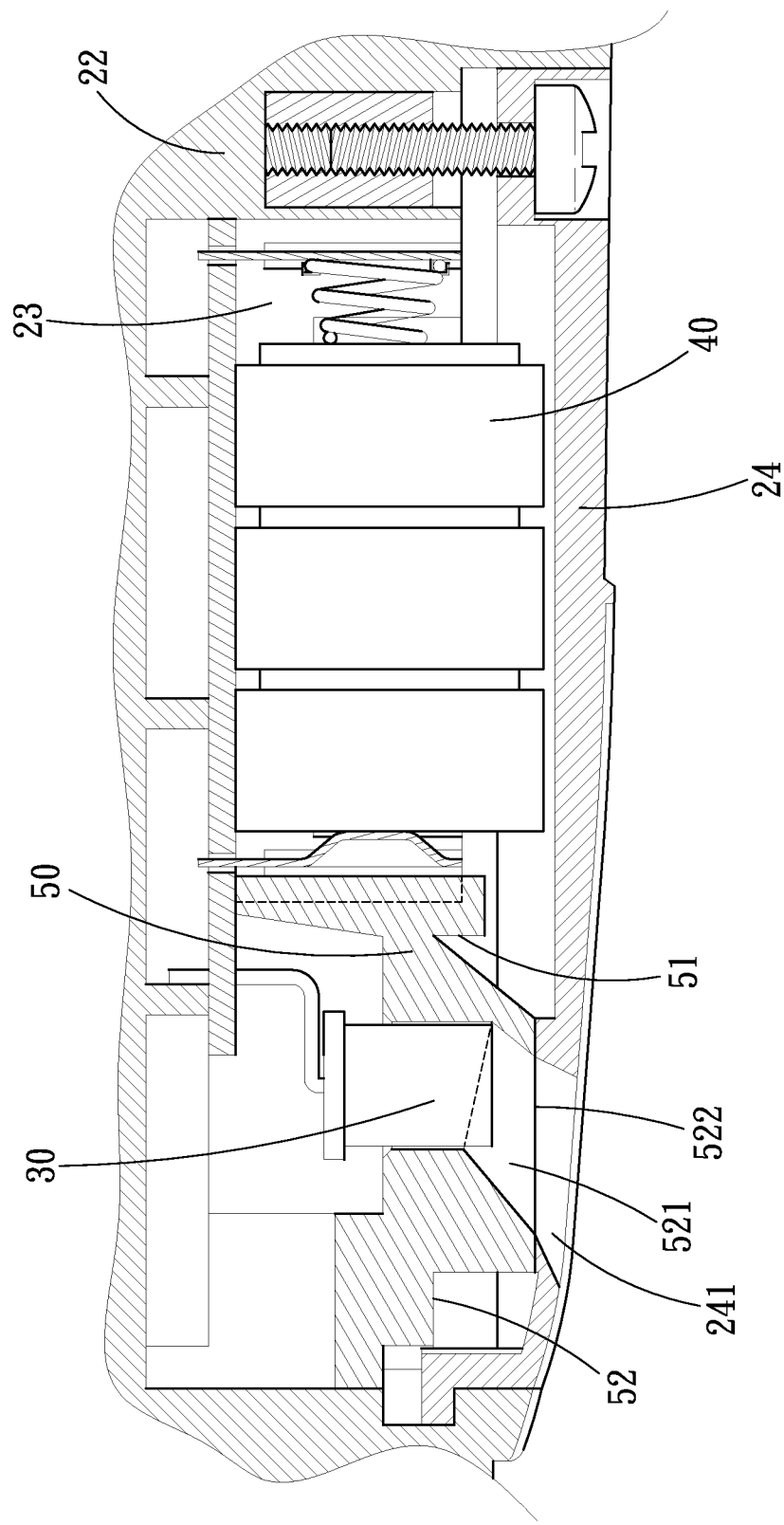
FIG. 6 is an enlarged view of a part of FIG. 5.
Figure 7:
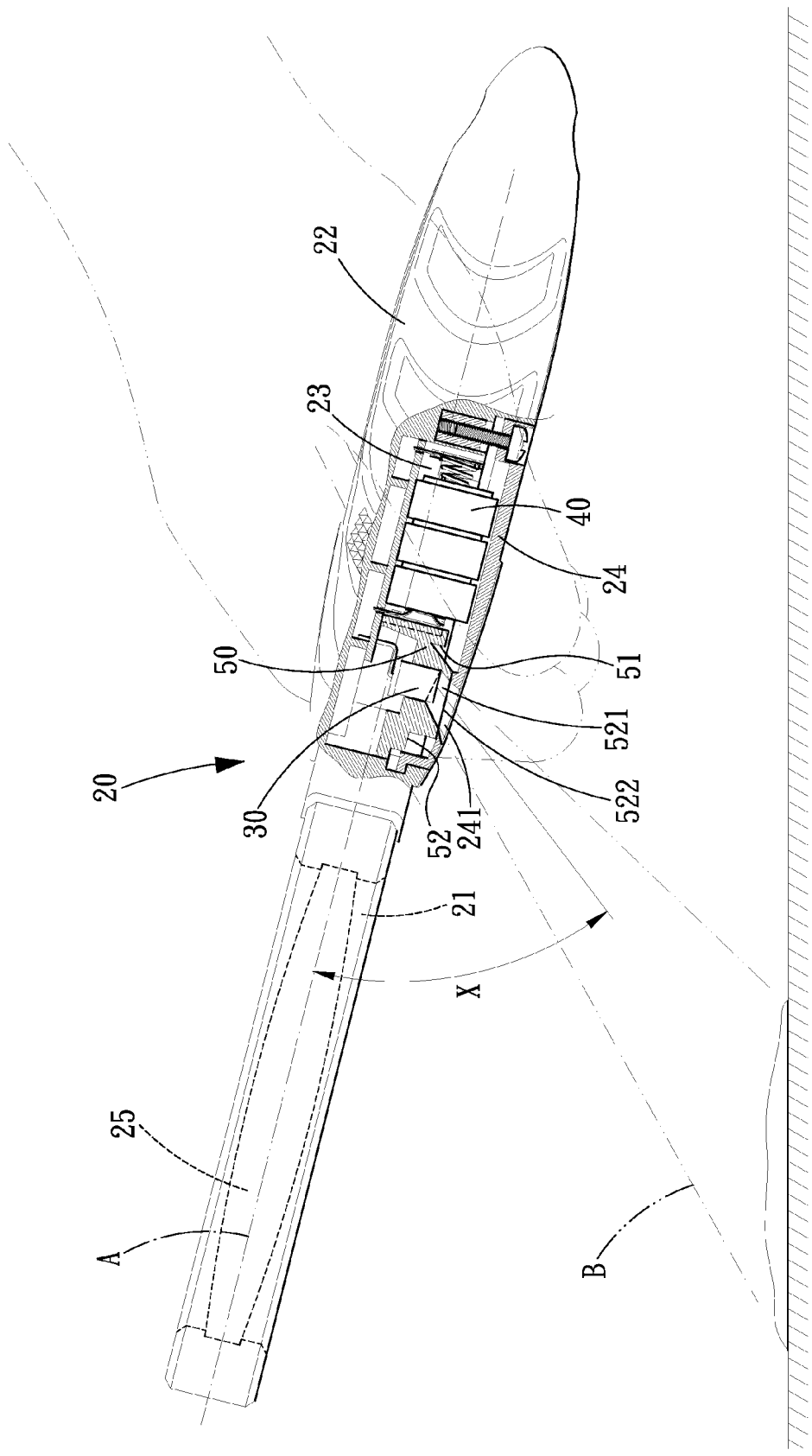
FIG. 7 is an operational view of the illuminating magnifying lens in accordance with the present invention.

For a better understanding of the operation of the present invention, reference should be made back to FIGS. 5-7, when the magnifying lens 20 is used to magnify the object 60, the projecting light of the lamp 30 is restricted by the light guiding member 50 and can only be emitted out from the open end 522 of the guiding hole 521, plus there is projecting angle X between the guiding hole 521 and the lens element 25, therefore, the light of the lamp 30 will be directed toward the object 60 without projecting onto the lens element 25, thus preventing dazzling reflection.

Figure 3:
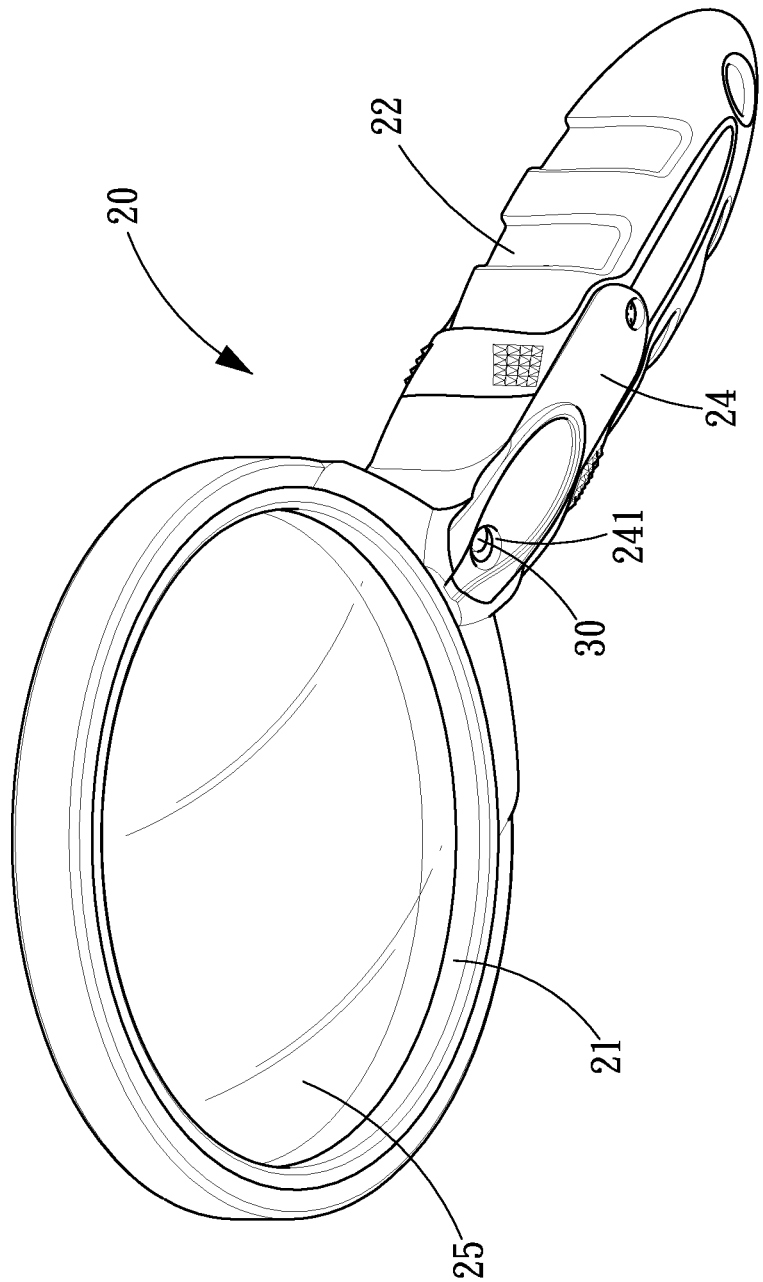
FIG. 3 is an assembly view of the illuminating magnifying lens in accordance with the present invention.
Figure 4:
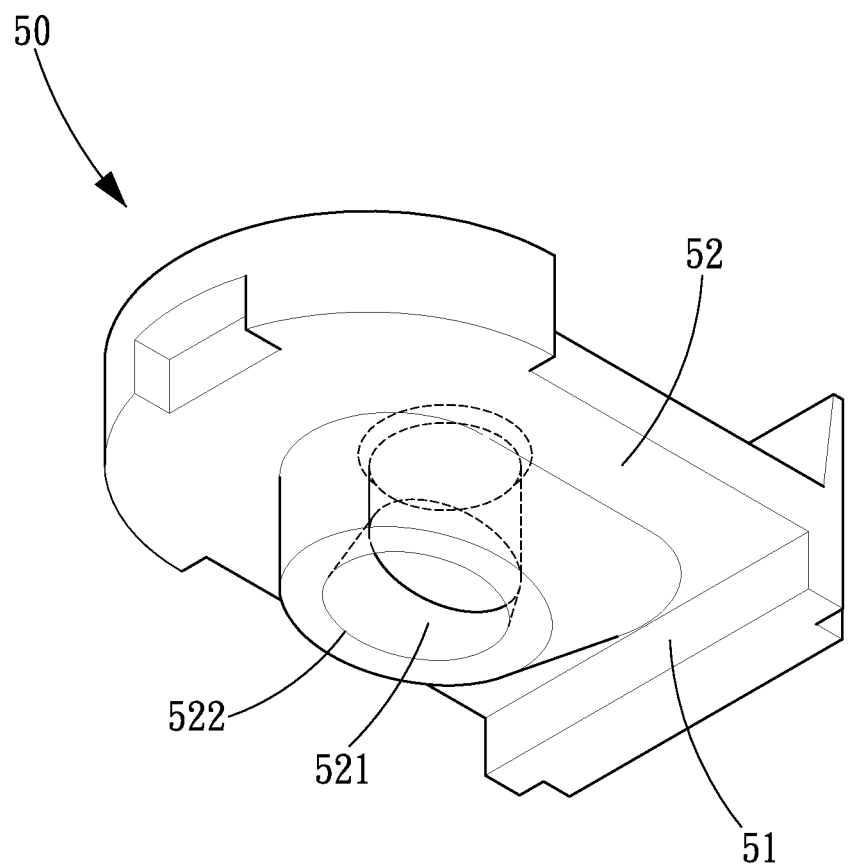
FIG. 4 is an enlarged view of a light guiding member of the illuminating magnifying lens in accordance with the present invention.

Referring then to FIGS. 3 and 7, the lamp 30 is disposed at the joint between the handle 22 and the frame 21, plus the design of the projecting angle X, the lamp 30 not only won't cause dazzling reflection to the lens element 25 but also won't affect the grip of the handle 22.

Referring finally to FIG. 6, the illuminating periphery of the lamp 30 is fully enclosed by the inner surface of the guiding hole 521 of the light guiding member 50, the projecting light of the lamp 30 can only be projected out from the open end 522 of the guiding hole 521, namely, the projecting angle of the lamp 30 is restricted, and the light of the lamp 30 can be prevented from projecting onto the lens element, thus solving the problem of dazzling reflection.

While we have shown and described various embodiments in accordance with the present invention, it is clear to those skilled in the art that further embodiments may be made without departing from the scope of the present invention.

What is claimed is:

1. An illuminating magnifying lens capable of focusing its light on objects comprising: a frame connected to a handle, and in a part of the handle jointing to the frame being defined an assembling groove covered with a cover, in the cover being formed with a hole, and an optical lens element being disposed in the frame, and an imaginary line defined by a periphery of the lens element being defined as longitudinal direction; a lamp disposed in the assembling groove and aligned with the hole to allow light of the lamp to be emitted out through the hole; a battery disposed in the assembling groove as a power source of the lamp; a light guiding member being light proof, one end of the light guiding member being formed with a vertical surface to be inserted in the assembling groove; characterized in that:

a guiding surface extends from the vertical surface toward another end of the light guiding member and is formed with a guiding hole, an imaginary line extending outward from the guiding hole is defined as projecting line which defines a projecting angle ranging from 35-65 degrees with respect to the longitudinal direction of the lens element, the vertical surface of the light guiding member is inserted in the assembling groove, and the lamp is disposed in the guiding hole, so that the light of the lamp is projected toward the object through an open end of the guiding hole and the hole.

2. The illuminating magnifying lens capable of focusing its light on objects as claimed in claim 1, wherein the lamp consists of light emitting diodes.

3. The illuminating magnifying lens capable of focusing its light on objects as claimed in claim 1, wherein the light guiding member is made of a material selected from the group consisting of wood, metal, and plastic.

* * * * *